Feb. 5, 1935.　　　　A. BRIASCO　　　　1,990,424
SAFETY OYSTER OPENER
Filed Dec. 11, 1933
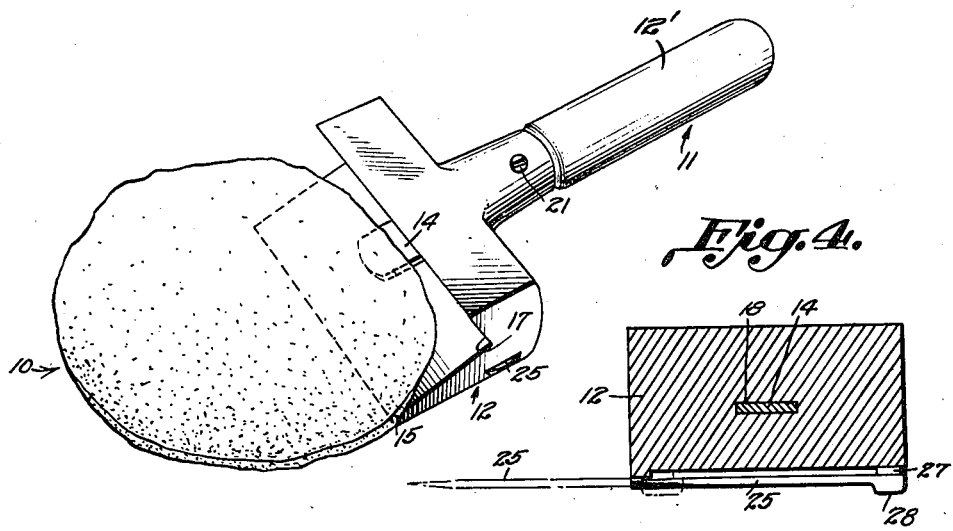
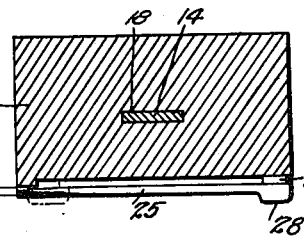
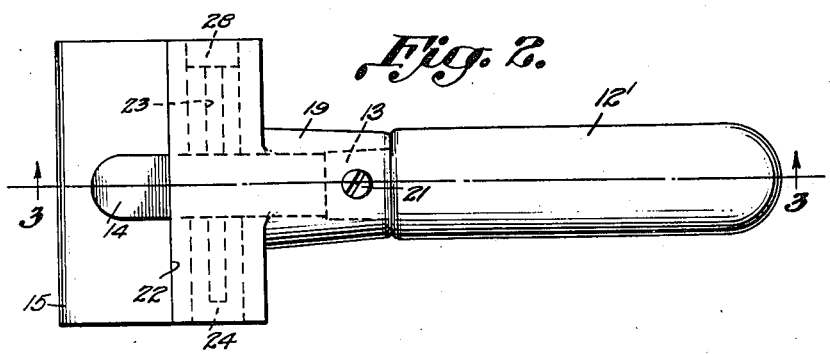
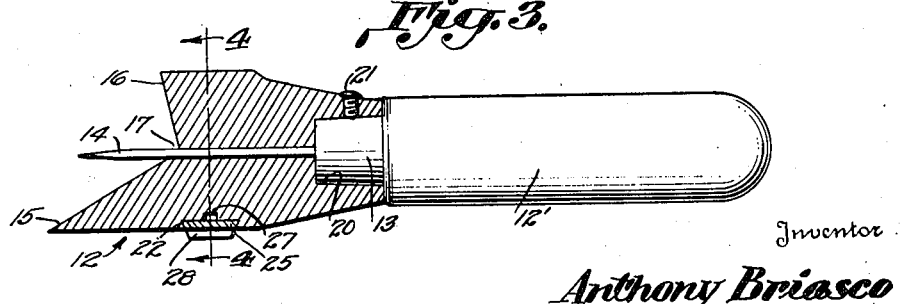
Inventor
Anthony Briasco
By Miller & Miller
Attorneys Patented Feb. 5, 1935

1,990,424

UNITED STATES PATENT OFFICE 1,990,424

SAFETY OYSTER OPENER

Anthony Briasco, New York, N. Y.

Application December 11, 1933, Serial No. 701,925

8 Claims. (Cl. 17—10)

This invention relates to a safety oyster opener and has for an object to provide an improved safety oyster opener especially useful for safely opening oysters, clams, mussels, or any other similar type of hard shelled sea food, or the like. The term oyster as hereinafter used is intended to generically define all such similar articles.

A further object of this invention is to provide a safety oyster opener which may be used for quickly and safely and easily opening the oyster shell and thereafter easily removing the edible portions from the open shell.

A further object of this invention is to provide a guard member which may cooperate with a dagger of more or less conventional type so that the blade of the dagger may be used for prying apart the half of the oyster shell without any danger of the blade slipping and injuring the operator.

A further object of this invention is to provide a safety oyster opener including a guard cooperating with a dagger blade, the guard including a ledge and a lip so that if the blade should slip and not enter into the oyster shell, the pocket formed by the meeting of the ledge and the lip of the guard would come against the edges of the oyster shell, thereby preventing the dagger blade from injuring the operator.

Still a further object of this invention is to provide a guard carrying a slidably extendible knife blade in an undercut channel therein, which knife blade may remain in protected position while the shell is being opened and then may be moved to the extended position by a flip of the thumb for quickly and easily cutting out the edible portions of the oyster, thereby eliminating the necessity for the operator to drop his opening member and pick up a separate knife each time a shell has been opened and is being emptied.

With the foregoing and other objects in view, as will hereinafter become apparent, this invention comprises the constructions, combinations and arrangements of parts, hereinafter set forth, disclosed and shown on the accompanying drawing. In this drawing, Figure 1 is a perspective view of the safety oyster opener partly inserted in an oyster, Figure 2 is a plan view of this invention, Figure 3 is a sectional view taken on the line 3—3 of Figure 2, and Figure 4 is a sectional view taken on the line 4—4 of Figure 3.

There is shown at 10 a conventional representation of an oyster, clam or other similar type of hard shelled sea food or the like, which contains an edible portion within a hard shelled exterior, the exterior generally consisting of two half shells. It is generally customary to open oysters and the like by inserting a knife blade or dagger between the halves of the shells and prying them apart, then taking a cutting knife and cutting out the inside or edible portion of the oyster. Inasmuch as it is generally necessary to hold the oyster 10 in one hand while the dagger is being manipulated with the other hand, there is great danger that the hand holding the oyster may be stabbed by the dagger if the dagger should slip over the edge of the shell.

The dagger shown at 11 has a guard member 12 mounted thereon, preventing the dagger from injuring the operator's hands. This dagger 11 consists of a handle member 12', a reduced neck portion 13 and a dagger blade 14 secured in the handle member 12' and extending through the reduced neck portion 13. Mounted over the dagger blade 14 and reduced neck member 13 is the guard member 12. This guard member 12 includes a projecting ledge member 15 and a shallow lip member 16 forming a pocket 17 at approximately the center of the guard member 12. An aperture 18 extends through the guard member 12 commencing at the pocket 17 between the ledge 15 and lip 16 and extending through a boss 19 on the opposite side of the guard member 12. This boss 19 is counterbored as at 20 so as to receive the reduced neck 13 of the handle 12', the aperture 18 being of a size and shape to cooperate with the dagger blade 14.

As will be observed, particularly from Figure 3, a set screw 21 projecting through the side of the boss 19 holds the guard 12 on the reduced neck 13 of the handle member 12' with the point of the dagger 14 extending through the pocket 17 beyond the shallow lip 16, but preferably not beyond the projecting ledge 15. As shown in Figure 1, this dagger edge 14 is inserted between the halves of the shell of the oyster 10 to pry them apart. If instead of entering between the halves of the shell of the oyster the blade 14 should slip to one side or the other of the oyster then the pocket 17 of the guard member would immediately contact with the edge of the oyster 10 and prevent the blade 14 from sliding over the top of the oyster shell and injuring the hand holding the other side of the shell.

After the shell is partly opened, it is necessary to insert a knife blade in between the opened shell halves and scoop out the edible portion therein. In order to have a knife blade available in a handy position and eliminate the necessity of picking up another knife member, one side of the guard member 12 is provided with an undercut channel 22 extending entirely across. In the center of this undercut channel 22 a slot 23 extends from one side of the guard partly across the guard to a stop member 24, limiting the length of the stop 24. It will be understood that the stop member 24 is formed by merely forming the slot 23 shorter than the channel 22. A beveled knife blade 25 having its outside bevelled as shown so as to cooperate with the sides of the undercut channel 22 is slidably received within the channel 22. A projection 27 formed on the bottom of the knife blade 25 rides in the slot 23 until it hits against the stop member 24, thereby limiting the extension of the knife blade 25 when it is moved to the extended position shown in dot dash outline in Figure 4.

A boss 28 on the top of the knife blade 25 serves as a handle for extending and retracting the blade 25 in its channel 23. In operation, the boss or handle 28 may be controlled by the thumb of the operator so as to keep the blade entirely within the channel while the dagger 14 is being used to open the oyster and then for quickly extending the blade 25 until its stop 27 hits against the stop 24 by a mere slip of the thumb, thus placing the blade 25 quickly in operative position for removing the inside of the oyster.

The novel features and the operation of this device will be apparent from the foregoing description. While the device has been shown and the structure described in detail, it is obvious that this is not to be considered limited to the exact form disclosed and that any changes may be made therein within the scope of what is claimed without departing from the spirit of the invention.

Having thus set forth and disclosed the nature of this invention, what is claimed is:

1. A safety oyster opener comprising a handle member, a dagger projecting from said handle member, and a guard member mounted over and extending beyond said projecting dagger member on said handle member.

2. A safety oyster opener comprising a handle member, a dagger projecting from said handle member, a guard member mounted over said projecting dagger member on said handle member, and a ledge on said guard member extending beyond said dagger member.

3. A safety oyster opener comprising a handle member, a dagger projecting from said handle member, a guard member mounted over said projecting dagger member on said handle member, a ledge on said guard member extending beyond said dagger member, and an extendible knife member slidably received on the back of said guard member.

4. A safety oyster opener comprising a dagger and a guard mounted on said dagger, said dagger comprising a handle member, a reduced neck on said handle member, a knife blade projecting from said reduced neck of said handle member, said guard comprising a block, a lip on one edge of said block, a ledge on an opposite edge of said slot projecting substantially beyond said lip but meeting said lip to form a pocket on one side of said block, and a projecting apertured boss on the opposite side of said block, said apertured boss receiving said reduced neck of said dagger therein with said knife extending through said slot and projecting therefrom between said ledge slot and said lip, the point of said dagger being in said pocket beyond said lip but not beyond said ledge.

5. A safety oyster opener comprising a dagger and a guard mounted on said dagger, said dagger comprising a handle member, a reduced neck on said handle member, a knife blade projecting from said reduced neck of said handle member, said guard comprising a block, a projecting ledge on said block, a lip on said block meeting said ledge on one side of said block, a projecting apertured boss on the opposite side of said block, said apertured boss receiving said reduced neck of said dagger therein with said knife extending through said slot and projecting therefrom between said ledge and said lip, a channel formed on one side of said block member, a knife blade slidably received in said channel, said knife blade being adapted to slide and extend from one edge of said channel, and cooperating stop means on said knife blade and in said channel limiting the extension of said knife blade in said channel.

6. In a safety oyster opener, a guard member, said guard member comprising a shallow lip and a ledge spaced from said lip and projecting substantially beyond said lip to form a pocket, an aperture extending through said guard member between said ledge and said lip, said aperture being adapted to receive a dagger therethrough with its point in said pocket.

7. In a safety oyster opener, a guard member, said guard member comprising a projecting ledge and a shallow lip, an aperture extending through said guard member between said ledge and said lip, said aperture being adapted to receive a dagger therethrough, an undercut channel extending across one side of said guard member, a counterbored slot in said channel extending part of the length of said channel, a knife blade slidably receivable in said undercut channel, a projection on said knife blade receivable in said counterbored slot adapted to limit the movement of said knife blade through said channel, and a boss on the opposite side of said knife blade acting as a handle for manipulating said knife blade in said channel.

8. In a safety oyster opener, a guard member, said guard member comprising a projecting ledge and a shallow lip, an aperture extending through said guard member between said ledge and said lip, said aperture being adapted to receive a dagger therethrough, an undercut channel extending across one side of said guard member, a counterbored slot in said channel extending part of the length of said channel, a knife blade slidably receivable in said undercut channel, a projection on said knife blade receivable in said counterbored slot adapted to limit the movement of said knife blade through said channel, a boss on the opposite side of said knife blade acting as a handle for manipulating said knife blade in said channel, and a counterbored boss aligned with said aperture, said counterbored boss being adapted to receive the dagger handle therein.

ANTHONY BRIASCO.